(12) United States Patent
Rosselot et al.

(10) Patent No.: US 7,864,694 B1
(45) Date of Patent: Jan. 4, 2011

(54) SYSTEM AND METHOD FOR PROVIDING A LINK QUALITY MONITOR FOR A 100MB ETHERNET PHYSICAL LAYER DEVICE

(75) Inventors: David R. Rosselot, Atlanta, GA (US); Andrew McLean, Duluth, GA (US)

(73) Assignee: National Semiconductor Corporation, Santa Clara, CA (US)

( * ) Notice: Subject to any disclaimer, the term of this patent is extended or adjusted under 35 U.S.C. 154(b) by 1253 days.

(21) Appl. No.: 11/377,020

(22) Filed: Mar. 16, 2006

(51) Int. Cl.
*H04L 12/26* (2006.01)
(52) U.S. Cl. ..................................... 370/252
(58) Field of Classification Search ............... 370/252, 370/328, 349, 241, 248; 455/132, 298
See application file for complete search history.

(56) References Cited

U.S. PATENT DOCUMENTS

| | | | | |
|---|---|---|---|---|
| 6,452,975 B1 * | 9/2002 | Hannah | | 375/257 |
| 2003/0134607 A1 * | 7/2003 | Raghavan et al. | | 455/132 |
| 2003/0169192 A1 * | 9/2003 | Jonsson | | 341/118 |
| 2004/0095901 A1 * | 5/2004 | Rajkotia | | 370/328 |
| 2005/0128998 A1 * | 6/2005 | Jelitto et al. | | 370/349 |
| 2007/0021087 A1 * | 1/2007 | Turner | | 455/298 |

* cited by examiner

*Primary Examiner*—Derrick W Ferris
*Assistant Examiner*—Omar Ghowrwal

(57) ABSTRACT

A system and method is disclosed for monitoring the quality of a data link in a 100 Mb Ethernet physical layer device. A link quality monitor detects operational values of data link parameters such as digital equalizer C1 coefficient, digital adaptive gain control, digital base line wander, recovered clock long-term frequency offset, and recovered clock frequency control. When an operational value of a data link parameter exceeds a high or low threshold value, the link quality monitor sends a drop link signal to cause the current data link to be dropped and a new data link established.

20 Claims, 11 Drawing Sheets

| BIT | BIT NAME | DEFAULT | DESCRIPTION |
| --- | --- | --- | --- |
| 15 | LQM_Enable | 0, RW | LINK QUALITY MONITOR ENABLE: ENABLES THE LINK QUALITY MONITOR. THE ENABLE IS QUALIFIED BY HAVING A VALID 100MB LINK. IN ADDITION, THE INDIVIDUAL THRESHOLDS CAN BE DISABLED BY SETTING TO THE MAX OR MIN VALUES. |
| 14 | Brk_Lnk_FC | 0, RW | BREAK LINK ON FREQUENCY CONTROL WARNING: ALLOW AUTOMATIC DROP OF 100MB LINK ON DETECTING A FREQUENCY THRESHOLD VIOLATION. IN AUTO-NEGOTIATION, THIS WILL FORCE A RENEGOTIATION. IN FORCED 100MB OPERATION, THIS WILL FORCE A RESET OF THE ADAPTATION. |
| 13 | Brk_Lnk_Freq | 0, RW | BREAK LINK ON FREQUENCY OFFSET WARNING: ALLOW AUTOMATIC DROP OF 100MB LINK ON DETECTING A FREQUENCY OFFSET THRESHOLD VIOLATION. IN AUTO-NEGOTIATION, THIS WILL FORCE A RENEGOTIATION. IN FORCED 100MB OPERATION, THIS WILL FORCE A RESET OF THE ADAPTATION. |
| 12 | Brk_Lnk_DBLW | 0, RW | BREAK LINK ON DBLW WARNING: ALLOW AUTOMATIC DROP OF 100MB LINK ON DETECTING A DBLW THRESHOLD VIOLATION. IN AUTO-NEGOTIATION, THIS WILL FORCE A RENEGOTIATION. IN FORCED 100MB OPERATION, THIS WILL FORCE A RESET OF THE ADAPTATION. |

| FIG. 4A |
| --- |
| FIG. 4B |

FIG. 4A

| BIT | BIT NAME | DEFAULT | DESCRIPTION |
|---|---|---|---|
| 11 | Brk_Lnk_DAGC | 0, RW | BREAK LINK ON DAGC WARNING:<br><br>ALLOW AUTOMATIC DROP OF 100MB LINK ON DETECTING A DAGC THRESHOLD VIOLATION. IN AUTO-NEGOTIATION, THIS WILL FORCE A RENEGOTIATION. IN FORCED 100MB OPERATION, THIS WILL FORCE A RESET OF THE ADAPTATION. |
| 10 | Brk_Lnk_C1 | 0, RW | BREAK LINK ON C1 WARNING:<br><br>ALLOW AUTOMATIC DROP OF 100MB LINK ON DETECTING A C1 THRESHOLD VIOLATION. IN AUTO-NEGOTIATION, THIS WILL FORCE A RENEGOTIATION. IN FORCED 100MB OPERATION, THIS WILL FORCE A RESET OF THE ADAPTATION. |
| 9 | FC_Hi_Warn | 0, RO/COR | FREQUENCY CONTROL HIGH WARNING:<br><br>THIS BIT INDICATES THE FREQUENCY CONTROL HIGH THRESHOLD WAS EXCEEDED. THIS REGISTER BIT WILL BE CLEARED ON READ. |
| 8 | FC_Lo_Warn | 0, RO/COR | FREQUENCY CONTROL LOW WARNING:<br><br>THIS BIT INDICATES THE FREQUENCY CONTROL LOW THRESHOLD WAS EXCEEDED. THIS REGISTER BIT WILL BE CLEARED ON READ. |

FIG. 4B

| PARAMETER | MINIMUM VALUE | MAXIMUM VALUE | MIN (2-S COMP) | MAX (2-S COMP) |
|---|---|---|---|---|
| DEQ C1 | −128 | +127 | 0x80 | 0x7F |
| DAGC | 0 | +255 | 0x00 | 0xFF |
| DBLW | −128 | +127 | 0x80 | 0x7F |
| FREQ OFFSET | −128 | +127 | 0x80 | 0x7F |
| FREQ CONTROL | −128 | +127 | 0x80 | 0x7F |

FIG. 8

| BIT | BIT NAME | DEFAULT | DESCRIPTION |
|---|---|---|---|
| 7 | Freq_Hi_Warn | 0, RO/COR | FREQUENCY OFFSET HIGH WARNING:<br><br>THIS BIT INDICATES THE FREQUENCY OFFSET HIGH THRESHOLD WAS EXCEEDED. THIS REGISTER BIT WILL BE CLEARED ON READ. |
| 6 | Freq_Lo_Warn | 0, RO/COR | FREQUENCY OFFSET LOW WARNING:<br><br>THIS BIT INDICATES THE FREQUENCY OFFSET LOW THRESHOLD WAS EXCEEDED. THIS REGISTER BIT WILL BE CLEARED ON READ. |
| 5 | DBLW_Hi_Warn | 0, RO/COR | DBLW HIGH WARNING:<br><br>THIS BIT INDICATES THE DBLW HIGH THRESHOLD WAS EXCEEDED. THIS REGISTER BIT WILL BE CLEARED ON READ. |
| 4 | DBLW_Lo_Warn | 0, RO/COR | DBLW LOW WARNING:<br><br>THIS BIT INDICATES THE DBLW LOW THRESHOLD WAS EXCEEDED. THIS REGISTER BIT WILL BE CLEARED ON READ. |
| 3 | DAGC_Hi_Warn | 0, RO/COR | DAGC HIGH WARNING:<br><br>THIS BIT INDICATES THE DAGC HIGH THRESHOLD WAS EXCEEDED. THIS REGISTER BIT WILL BE CLEARED ON READ. |
| 2 | DAGC_Lo_Warn | 0, RO/COR | DAGC LOW WARNING:<br><br>THIS BIT INDICATES THE DAGC LOW THRESHOLD WAS EXCEEDED. THIS REGISTER BIT WILL BE CLEARED ON READ. |
| 1 | C1_Hi_Warn | 0, RO/COR | C1 HIGH WARNING:<br><br>THIS BIT INDICATES THE DEQ C1 HIGH THRESHOLD WAS EXCEEDED. THIS REGISTER BIT WILL BE CLEARED ON READ. |
| 0 | C1_Lo_Warn | 0, RO/COR | C1 LOW WARNING:<br><br>THIS BIT INDICATES THE DEQ C1 LOW THRESHOLD WAS EXCEEDED. THIS REGISTER BIT WILL BE CLEARED ON READ. |

FIG. 5

| BIT | BIT NAME | DEFAULT | DESCRIPTION |
|---|---|---|---|
| 15:14 | RESERVED | 0, RO | RESERVED: WRITES IGNORED, READ AS 0 |
| 13 | Sample_Param | 0, RW | SAMPLE DSP PARAMETER:<br><br>SETTING THIS BIT TO A 1 ENABLES READING OF CURRENT PARAMETER VALUES AND INITIATES SAMPLING OF THE PARAMETER VALUE. THE PARAMETER TO BE READ IS SELECTED BY THE LQ_Param_Sel BITS. |
| 12 | Write_LQ_Thr | 0, RW | WRITE LINK QUALITY THRESHOLD:<br><br>SETTING THIS BIT WILL CAUSE A WRITE TO THE THRESHOLD REGISTER SELECTED BY LQ_Thr_Sel. THE DATA WRITTEN IS CONTAINED IN LQ_Thr_Data. THIS BIT WILL ALWAYS READ BACK AS 0. |
| 11:9 | LQ_Param_Sel | 0, RW | LINK QUALITY PARAMETER SELECT:<br><br>THIS 3-BIT FIELD SELECTS THE LINK QUALITY PARAMETER. THIS FIELD IS USED FOR SAMPLING CURRENT PARAMETER VALUES AS WELL AS FOR READS/WRITES TO THRESHOLD VALUES. THE FOLLOWING ENCODINGS ARE AVAILABLE:<br><br>000: DEQ_C1<br>001: DAGC<br>010: DBLW<br>011: FREQUENCY OFFSET<br>100: FREQUENCY CONTROL |

FIG. 6

| BIT | BIT NAME | DEFAULT | DESCRIPTION |
|---|---|---|---|
| 8 | LQ_Thr_Sel | 0, RW | LINK QUALITY THRESHOLD SELECT:<br>THIS BIT SELECTS THE LINK QUALITY THRESHOLD TO BE READ OR WRITTEN. A 0 SELECTS THE LOW THRESHOLD, WHILE A 1 SELECTS THE HIGH THRESHOLD. WHEN COMBINED WITH THE LQ_Param_Sel FIELD, THE FOLLOWING ENCODINGS ARE AVAILABLE (LQ_Param_Sel, LQ_Thr_Sel):<br>000,0: DEQ_C1_Low<br>000,1: DEQ_C1_High<br>001,0: DAGC LOW<br>001,1: DAGC HIGH<br>010,0: DBLW LOW<br>010,1: DBLW HIGH<br>011,0: FREQUENCY OFFSET LOW<br>011,1: FREQUENCY OFFSET HIGH<br>100,0: FREQUENCY CONTROL LOW<br>100,1: FREQUENCY CONTROL HIGH |
| 7:0 | LQ_Thr_Data | 0, RW | LINK QUALITY THRESHOLD DATA:<br>THE OPERATION OF THIS FIELD IS DEPENDENT ON THE VALUE OF THE Sample_Param BIT.<br>IF Sample_Param = 0:<br>ON A WRITE, THIS VALUE CONTAINS THE DATA TO BE WRITTEN TO THE SELECTED LINK QUALITY THRESHOLD REGISTER.<br>ON A READ, THIS VALUE CONTAINS THE CURRENT DATA IN THE SELECTED LINK QUALITY THRESHOLD REGISTER.<br>IF Sample_Param = 1:<br>ON A READ, THIS VALUE CONTAINS THE SAMPLED PARAMETER VALUE. THIS VALUE WILL REMAIN UNCHANGED UNTIL A NEW READ SEQUENCE IS STARTED. |

FIG. 7

| SIGNAL | IN/OUT | SOURCE/DEST | DESCRIPTION |
|---|---|---|---|
| lqm_drop_link | OUT | DSP | COMMAND TO DROP LINK AND RESTART ADAPTATION BASED ON A LINK QUALITY MONITOR WARNING |
| lqm_rd_data[7:0] | OUT | REGISTERS | READ DATA FROM THRESHOLD REGISTERS. REGISTER IS SELECTED BY lqm_thr_sel[2:0]. |
| lqm_status[9:0] | OUT | REGISTERS | LINK QUALITY MONITOR WARNING STATUS. CONTAINS THE CONCATENATED STATUS BITS FROM THE THRESHOLD COMPARATORS. |
| agc_adapt[7:0] | IN | DSP | UPPER 8 BITS OF AGC PARAMETER VALUE. |
| blw_adapt[7:0] | IN | DSP | UPPER 8 BITS OF BLW PARAMETER VALUE. |
| clk | IN | | 125MHz RECEIVE CLOCK |
| eq_coef_1[7:0] | IN | DSP | UPPER 8 BITS OF THE DEQ C1 COEFFICIENT |
| lqm_auto_rst[4:0] | IN | REGISTERS | ENABLES AUTOMATIC RESET OF DSP UPON A LINK QUALITY MONITOR WARNING. |
| lqm_enable | IN | REGISTERS | ENABLE LINK QUALITY MONITOR |

FIG. 9A

| SIGNAL | IN/OUT | SOURCE/DEST | DESCRIPTION |
|---|---|---|---|
| lqm_load_thr | IN | REGISTERS | LOAD VALUE ON lqm_wr_data TO THE SELECTED THRESHOLD REGISTER. REGISTER IS SELECTED BY lqm_thr_sel. |
| lqm_thr_sel[3:0] | IN | REGISTERS | SELECTS THRESHOLD REGISTER FOR READ/WRITE ACCESS. |
| lqm_wr_data[7:0] | IN | REGISTERS | WRITE DATA FOR THRESHOLD REGISTER WRITES. |
| pmd_init_locked | IN | DSP | INDICATES DSP INITIALIZATION IS COMPLETE. THIS SIGNAL IS USED TO ALLOW COMPARISONS AGAINST THE THRESHOLDS. IF THIS SIGNAL IS NOT ASSERTED, THE LINK QUALITY MONITOR WILL NOT REPORT ANY THRESHOLD VIOLATIONS. |
| rst_n | IN | RESET | RESET SIGNAL. |
| trl_beta[7:0] | IN | DSP | BETA ACCUMULATOR FOR THE TIMING RECOVERY LOOP. INDICATES FREQUENCY OFFSET OF LOCAL STATION TO PARTNER. |
| trl_lfo[7:0] | IN | DSP | FREQUENCY CONTROL OUTPUT OF THE TIMING RECOVERY LOOP. INCLUDES SHORT TERM PHASE CORRECTION IN ADDITION TO FREQUENCY OFFSET. |

FIG. 9B

SYSTEM AND METHOD FOR PROVIDING A LINK QUALITY MONITOR FOR A 100MB ETHERNET PHYSICAL LAYER DEVICE

TECHNICAL FIELD OF THE INVENTION

The present invention is generally directed to Ethernet physical layer devices and, in particular, to a system and method for providing a link quality monitor in a 100 Mb Ethernet physical layer device.

BACKGROUND OF THE INVENTION

In many networking applications, such as industrial Ethernet, maintaining and monitoring the quality of a data link is an important issue. It is very desirable to know when a digital signal processor that recovers data in an Ethernet physical layer device is operating within its proper parameters. Changes in the operating parameters could indicate a degradation in the link quality. Notifying the system of potential issues in the cabling may allow network administrators to detect potential issues before they become critical and cause failure of the network.

The present invention will be described with reference to an exemplary Ethernet physical layer device. It is understood, however, that the principles of the present invention are not limited to the exemplary network embodiment described in this patent document.

The operation of a physical layer device is described in an IEEE publication entitled "IEEE Standards for Local and Metropolitan Area Networks: Media Access Control (MAC) Parameters, Physical Layer, Medium Attachment Units, and Repeater for 100 Mb/s Operation, Type 100BASE-T." The short name of this standard is IEEE Standard 802.3. The Physical Medium Dependent (PMD) sublayer for 100BASE-TX is defined in "Fibre Distributed Data Interface (FDDI)—Token Ring Twisted Pair Physical Layer Medium Dependent (TP-PMD)" (ANSI X3.263: 1995). The TP-PMD document provides the specification for receiving signaling on the physical medium and converting it to the digital representation required by the Physical Medium Attachment (PMA) and Physical Coding (PCS) sublayers. A commonly used method of implementing the Twisted Pair PMD sublayer utilizes a Digital Signal Processor (DSP) to recover the data and clock from the physical layer signaling.

There is a need in the art for a system and method that is capable of monitoring the quality of a data link in a 100 Mb Ethernet physical layer device. In particular, there is a need in the art for a system and method that is capable of monitoring data link parameters in a digital signal processor that recovers data in an Ethernet physical layer device.

In order to better understand the advance in the art that the present invention provides, a prior art Ethernet system will be first described. FIG. 1 illustrates a block diagram 100 of a prior art Ethernet system. FIG. 1 shows the basic components of a single Ethernet capable device connected to a physical cable. The device comprises a Media Access Controller ("Ethernet MAC 11") that is capable of sending and receiving packetized data through an Ethernet physical layer device 12 ("Ethernet PHY 12") to a physical medium such as a Category 5 Cable ("Cat5 Cable 13"). The Ethernet MAC 11 sends and receives packetized data across the MAC Data Interface. The MAC Data Interface may be either a Media Independent Interface ("MII") or a Reduced Media Independent Interface ("RMII"). The Ethernet MAC 11 controls the Ethernet PHY 12 and monitors its status through a Management Interface (designated "Mgmt Interface" in FIG. 1).

The Ethernet PHY 12 also requires a clock source 14. The clock source 14 comprises a twenty five megaHertz (25 MHz) clock when an MII interface is used. The clock source 14 comprises a fifty megaHertz (50 MHz) clock when an RMII interface is used. In addition, the Ethernet PHY 12 may comprise status light emitting diodes 15 ("Status LEDs 15") in order to externally provide visible indication of the status of the Ethernet PHY 12.

The Ethernet PHY 12 is connected to the Cat5 Cable 13 through a Magnetics unit 16 and an RJ-45 Connector 17. For simplicity and clarity, the Magnetics unit 16 and the RJ-45 Connector 17 will not be shown in subsequent figures.

FIG. 2 illustrates a block diagram of a prior art Ethernet Receive Phy 150 and Receive Mac 120. The data that is received from Category 5 cable 140 is provided to a Receive (RX) Physical Media Dependent (PMD) block 200. PMD block 200 comprises analog front end 205 and digital signal processor 210. Analog front end 205 converts the analog signals from Category 5 cable 140 into a digital form and provides the digital form of the analog signals to digital signal processor 210. Digital signal processor 210 processes the digital form of the data and recovers the transmitted data and clock signals.

As described in the IEEE Standard 802.3, the data is then sequentially provided to a Physical Medium Attachment (PMA) sublayer 215, a Physical Coding Sublayer (PCS) 220, and Media Access Controller (MAC) data interface unit 225. The MAC data interface unit 225 is capable of operating either in Media Independent Interface (MII) mode or in Reduced Media Independent Interface (RMII) mode. The MAC data interface unit 225 provides the received data to the Media Access Controller 120. As indicated in FIG. 2, Media Access Controller 120 may comprise a microprocessor unit (MPU) or a central processing unit (CPU).

The Ethernet Receive Phy 150 comprises a set of management registers in Register Block 230. The management registers are used by the Media Access Controller 120 to control the Ethernet Receive Phy 150 and to monitor the status of its operation. The management interface is commonly provided through a serial management interface defined in Clause 22 of the IEEE 802.3 specification. In addition, the Ethernet Receive Phy 150 shown in FIG. 2 is capable of providing an interrupt signal to the Media Access Controller 120.

As previously mentioned, there is a need in the art for a system and method that is capable of monitoring the quality of a data link in a 100 Mb Ethernet physical layer device and that is capable of monitoring data link parameters in a Ethernet digital signal processor.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

The term "controller" means any device, system, or part thereof that controls at least one operation. A controller may be implemented in hardware, software, firmware, or combination thereof. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts:

FIGS. 4A and 4B illustrate a first portion of a Link Quality Monitor Register of the present invention;

FIG. 5 illustrates a second portion of a Link Quality Monitor Register of the present invention;

FIG. 6 illustrates a first portion of a Link Quality Data Register of the present invention;

FIG. 7 illustrates a second portion of a Link Quality Data Register of the present invention;

FIG. 8 illustrates parameter ranges of the link quality monitor of the present invention;

FIGS. 9A and 9B illustrate some input/output signal interface definitions for the link quality monitor of the present invention.

DETAILED DESCRIPTION OF THE INVENTION

FIGS. 3 through 10, discussed below, and the various embodiments used to describe the principles of the present invention in this patent document are by way of illustration only and should not be construed in any way to limit the scope of the invention. Those skilled in the art will understand that the principles of the present invention may be implemented with any type of suitably arranged network physical layer device.

Figure 1:
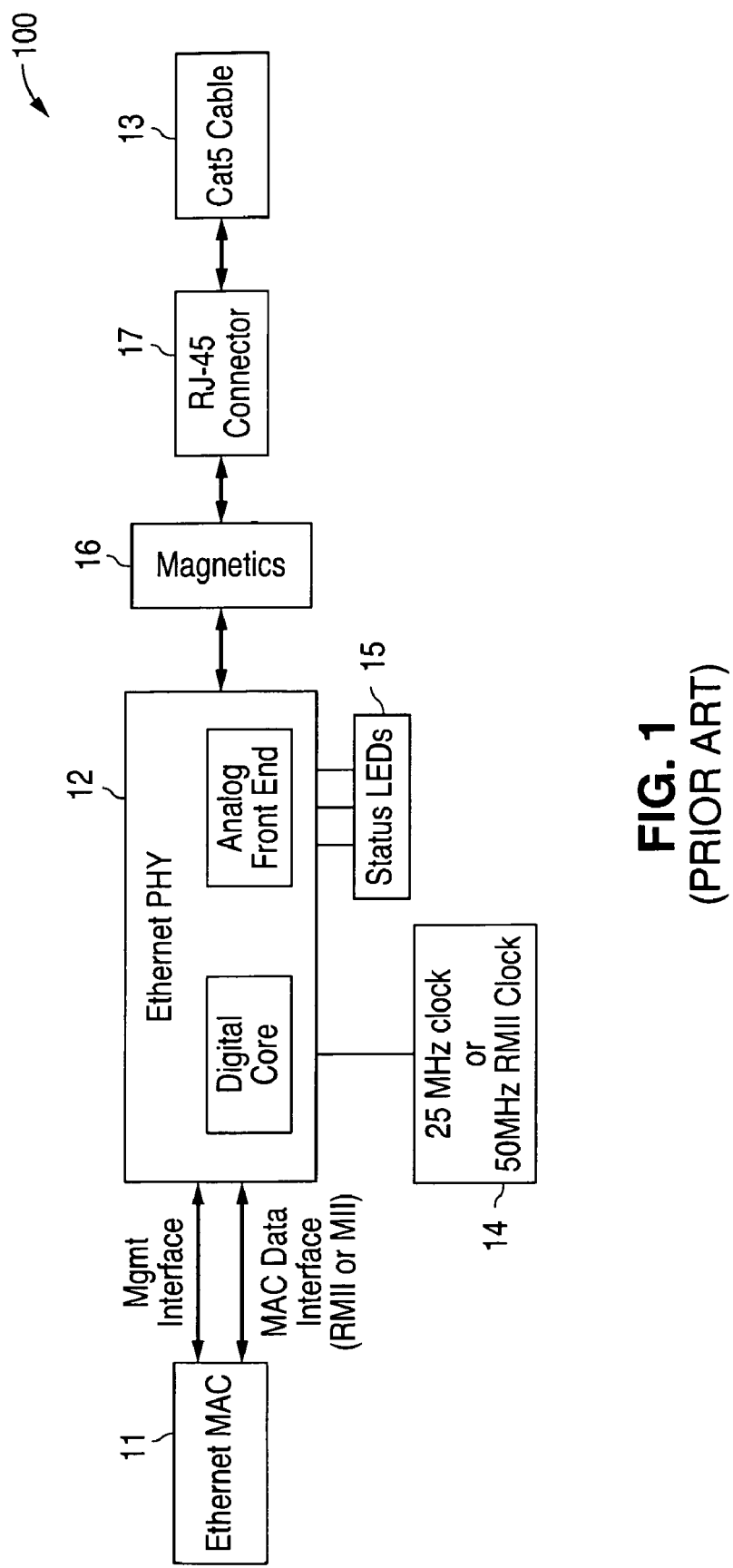
FIG. 1 illustrates a block diagram of a prior art Ethernet system.
Figure 2:
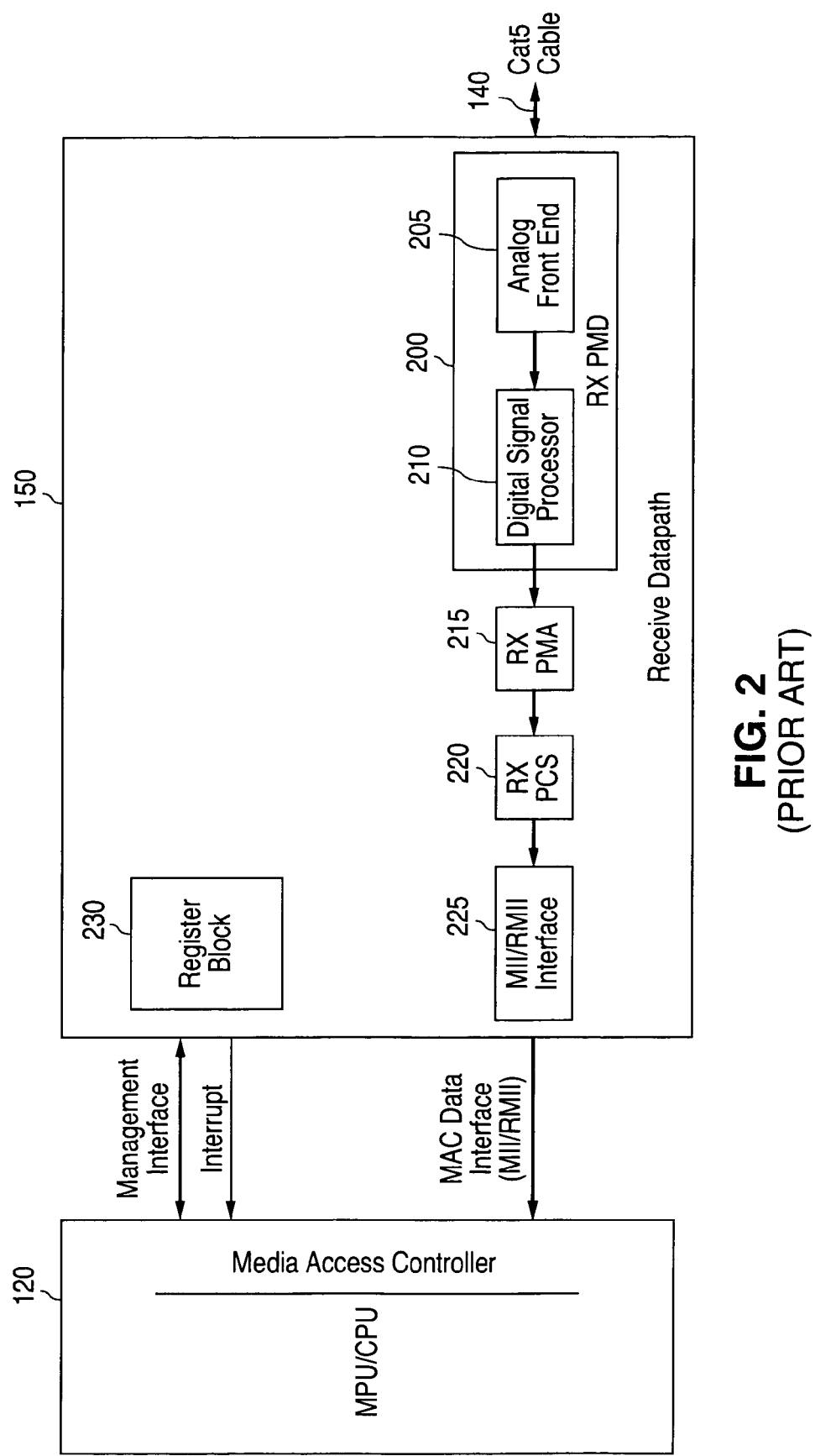
FIG. 2 illustrates a block diagram of a prior art Ethernet physical layer device.
Figure 3:
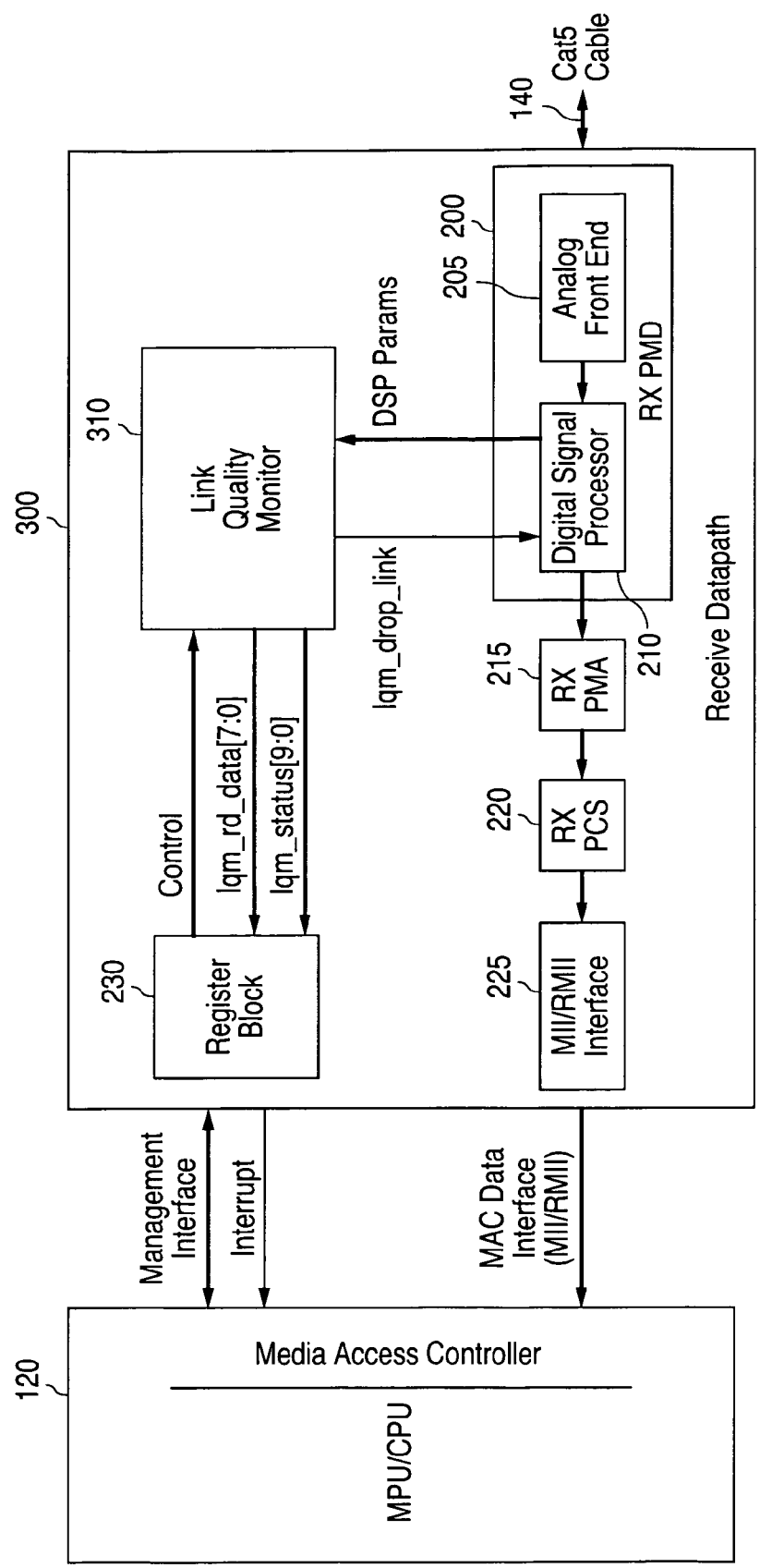
FIG. 3 illustrates a block diagram of an Ethernet physical layer device in accordance with the principles of the present invention.

FIG. 3 illustrates a block diagram of an Ethernet physical layer device 300 of the present invention. Ethernet physical layer device 300 comprises a link quality monitor 310 that monitors data link quality in digital signal processor 210. As shown in FIG. 3, the link quality monitor 310 is coupled to the digital signal processor 210.

The link quality monitor 310 receives a plurality of input signals. As shown in FIG. 3, the link quality monitor 310 receives control signals from the Register Block 230. The link quality monitor 310 also receives input signals from digital signal processor 210. As will be more fully described below, the input signals from digital signal processor 210 comprise signals that describe the operational parameters of the data link. The operational parameters are designated "DSP Params" in FIG. 3.

The output signals from the link quality monitor 310 are also shown in FIG. 3. The link quality monitor 310 is capable of sending a "drop link" signal (designated "lqm_drop_link") to the digital signal processor 210. The link quality monitor 310 is also capable of sending operational status signals (designated "lqm_status[9:0]" and data signals (designated "lqm-_rd_data[7:0]") to the Register Block 230. The various signals sent by the link quality monitor 310 will be discussed more fully below.

The link quality monitor 310 generates an alarm when the operation of the digital signal processor 210 deviates from a specific (programmable) range of operational values. For example, such deviations might occur due to changes in the Category 5 cable 140 that indicate the presence of a potential problem.

The link quality monitor 310 of the present invention comprises a controller that comprises hardware and software. The link quality monitor software is capable of receiving user instructions and, in response to the user instructions, is capable of programming high and low operational thresholds for a number of different parameters of digital signal processor 210. Operational thresholds can be programmed for the following parameters:

(1) Digital Equalizer C1 Coefficient ("DEQ C1");

(2) Digital Adaptive Gain Control ("DAGC");

(3) Digital Base-Line Wander Control ("DBLW");

(4) Recovered Clock Long-Term Frequency Offset ("Freq Offset"); and (5) Recovered Clock Frequency Control ("Freq Control").

The link quality monitor software reads initial adapted values of the parameters and then programs the operational thresholds for the parameters based on an expected valid range. This approach takes advantage of the fact that the digital signal processing adaptation should remain in a relatively small range after a valid link has been established.

The link quality monitor 310 detects changes in the digital signal processing adaptation parameters. If a particular parameter goes outside of the programmed range, then the link quality monitor 310 will send an indication (signifying too high or too low a value) to the Register Block 230. The indication can be used to interrupt the operation of the Media Access Controller 120. The indication can also be used to initiate monitoring of the status of the link quality by register polling using the system software of the Ethernet physical layer device.

In addition, the link quality monitor 310 can be programmed to reset the digital signal processor 210 and readapt the parameters if the operational value of the parameters gets outside of the programmed range of values.

Control of the link quality monitor 310 is achieved through a Link Quality Monitor Register ("LQMR") and a Link Quality Data Register ("LQDR"). The Link Quality Monitor Register ("LQMR") and a Link Quality Data Register ("LQDR") may be located within the Register Block 230. The contents of the Link Quality Monitor Register ("LQMR") are set forth in FIGS. 4A and 4B and in FIG. 5. The contents of the Link Quality Data Register ("LQDR") are set forth in FIG. 6 and in FIG. 7.

The Link Quality Monitor Register ("LQMR") comprises a global enable ("LQM_Enable") to enable the function of the link quality monitor 310. In addition, the Link Quality Monitor Register ("LQMR") provides warning status from both high thresholds and low thresholds for each of the monitored parameters. The individual high parameter threshold comparisons (or the individual low parameter threshold comparisons) can be disabled by setting the threshold value to the maximum (or minimum) value.

To enable the link quality monitor 310 to interrupt the operation of the Media Access Controller 120, an Interrupt signal must be enabled through the interrupt control registers (not shown) in Register Block 230.

The link quality monitor 310 may also be used to automatically reset the digital signal processor 210 and restart the adaptation process. Separate enable bits in the Link Quality Monitor Register ("LQMR") permit an automatic reset based on the value of each of the parameter values. If the automatic reset is enabled, then a violation of one of the threshold values will result in an automatic reset of the current link status. If the system is in an Auto-Negotiation mode, the reset procedure will restart the Auto-Negotiation process. If the system is in a forced 100 Mb mode, the reset procedure will force a restart of the digital signal processor ("DSP") adaptation process.

The Link Quality Monitor Register ("LQMR") shown in FIGS. 4A and 4B and in FIG. 5 contains the controls for controlling the link quality monitor 310. The link quality monitor 310 provides a mechanism for programming a set of thresholds for the operational values of the digital signal processing ("DSP") parameters. If the thresholds are violated, an interrupt will be asserted if the interrupt capability is enabled in the interrupt control registers (not shown) of the Register Block 230.

Monitor control and status information are available in the Link Quality Monitor Register ("LQMR"), while the Link Quality Data Register ("LQDR") controls read/write access to threshold values and current parameter values. Reading the Link Quality Monitor Register ("LQMR") clears the warning bits and re-arms the interrupt generation function. In addition, the Link Quality Monitor Register ("LQMR") provides a mechanism for allowing an automatic reset of the 100 MB link based on the status of the link quality monitor 310.

The Link Quality Monitor Register ("LQMR") contains sixteen (16) bits. The sixteen (16) bits are as follows:

Bit 15 is a Link Quality Monitor Enable bit designated "LQM_Enable." Bit 15 enables the operation of link quality monitor 310. The enable is qualified by having a valid 100 Mb link. In addition, the individual parameter thresholds can be disabled by setting the threshold value to the maximum or minimum values.

Bit 14 is a Break Link on Frequency Control Warning bit designated "Brk_Lnk_FC." Bit 14 allows the automatic breaking of the 100 Mb link on detecting a Frequency Threshold violation. In Auto-Negotiation mode, bit 14 will force a renegotiation. In forced 100 Mb operation mode, bit 14 will force a reset of the digital signal processor adaptation process.

Bit 13 is a Break Link on Frequency Offset Warning bit designated "Brk_Lnk_Freq." Bit 13 allows the automatic breaking of the 100 Mb link on detecting a Frequency Offset Threshold violation. In Auto-Negotiation mode, bit 13 will force a renegotiation. In forced 100 Mb operation mode, bit 13 will force a reset of the digital signal processor adaptation process.

Bit 12 is a Break Link on DBLW (Digital Base Line Wander) Warning bit designated "Brk_Lnk_DBLW." Bit 12 allows the automatic breaking of the 100 Mb link on detecting a Digital Base Line Wander (DBLW) Threshold violation. In Auto-Negotiation mode, bit 12 will force a renegotiation. In forced 100 Mb operation mode, bit 12 will force a reset of the digital signal processor adaptation process.

Bit 11 is a Break Link on DAGC (Digital Adaptive Gain Control) Warning bit designated "Brk_Lnk_DAGC." Bit 11 allows the automatic breaking of the 100 Mb link on detecting a Digital Adaptive Gain Control (DAGC) Threshold violation. In Auto-Negotiation mode, bit 11 will force a renegotiation. In forced 100 Mb operation mode, bit 11 will force a reset of the digital signal processor adaptation process.

Bit 10 is a Break Link on C1 (Digital Equalizer C1 Coefficient) Warning bit designated "Brk_Lnk_C1." Bit 10 allows the automatic breaking of the 100 Mb link on detecting a Digital Equalizer C1 Coefficient (C1) Threshold violation. In Auto-Negotiation mode, bit 10 will force a renegotiation. In forced 100 Mb operation mode, bit 10 will force a reset of the digital signal processor adaptation process.

Bit 9 is a Frequency Control High Warning bit designated "FC_Hi_Warn." Bit 9 indicates that the Frequency Control High Threshold was exceeded. Bit 9 will be cleared when it is read.

Bit 8 is a Frequency Control Low Warning bit designated "FC_Lo_Warn." Bit 8 indicates that the Frequency Control Low Threshold was exceeded. Bit 8 will be cleared when it is read.

Bit 7 is a Frequency Offset High Warning bit designated "Freq_Hi_Warn." Bit 7 indicates that the Frequency Offset High Threshold was exceeded. Bit 7 will be cleared when it is read.

Bit 6 is a Frequency Offset Low Warning bit designated "Freq_Lo_Warn." Bit 6 indicates that the Frequency Offset Low Threshold was exceeded. Bit 6 will be cleared when it is read.

Bit 5 is a Digital Base Line Wander (DBLW) High Warning bit designated "DBLW_Hi_Warn." Bit 5 indicates that the DBLW High Threshold was exceeded. Bit 5 will be cleared when it is read.

Bit 4 is a Digital Base Line Wander (DBLW) Low Warning bit designated "DBLW_Lo_Warn." Bit 4 indicates that the DBLW Low Threshold was exceeded. Bit 4 will be cleared when it is read.

Bit 3 is a Digital Adaptive Gain Control (DAGC) High Warning bit designated "DAGC_Hi_Warn." Bit 3 indicates that the DAGC High Threshold was exceeded. Bit 3 will be cleared when it is read.

Bit 2 is a Digital Adaptive Gain Control (DAGC) Low Warning bit designated "DAGC_Lo_Warn." Bit 2 indicates that the DBLW Low Threshold was exceeded. Bit 2 will be cleared when it is read.

Bit 1 is a Digital Equalizer C1 Coefficient (C1) High Warning bit designated "C1_Hi_Warn." Bit 1 indicates that the Digital Equalizer C1 High Threshold was exceeded. Bit 1 will be cleared when it is read.

Bit 0 is a Digital Equalizer C1 Coefficient (C1) Low Warning bit designated "C1_Lo_Warn." Bit 0 indicates that the Digital Equalizer C1 Low Threshold was exceeded. Bit 0 will be cleared when it is read.

The Link Quality Data Register ("LQDR") shown in FIG. 6 and in FIG. 7 provides the read/write control of thresholds for the 100 Mb link quality monitor 310. The Link Quality Data Register ("LQDR") also provides a mechanism for reading current adapted parameter values. Threshold values may not be written when the device is in a "power down" mode.

The Link Quality Data Register ("LQDR") contains sixteen (16) bits. The sixteen (16) bits are as follows:

Bit 15 and Bit 14 are reserved. Writes to Bit 15 and to Bit 14 are ignored. Reads from Bit 15 and from Bit 14 read as zero.

Bit 13 is a Sample DSP Parameter bit designated "Sample_Param." Setting Bit 13 to one ("1") enables the reading of the current parameter values and initiates sampling of the parameter value. The parameter to be read is selected by the "LQ_Param_Sel" bits (described below).

Bit 12 is a Write Link Quality Threshold bit designated "Write_LQ_Thr." Setting Bit 12 will cause a write to the threshold register selected by the "LQ_Thr_Sel" bit (described below). Bit 12 will always be read back as zero.

Bit 11, Bit 10 and Bit 9 are Link Quality Parameter Select bits designated "LQ_Param_Sel." These three bits select the Link Quality Parameter. These three bits are used for sampling current parameter values. These three bits are also used for reads and writes to the threshold values. Bit 11, Bit 10 and Bit 9 are used to represent the following encodings:

(1) "000" represents DEQ_C1

(2) "001" represents DAGC (3) "010" represents DBLW (4) "011" represents Frequency Offset (5) "100" represents Frequency Control Bit 8 is a Link Quality Threshold Select bit designated "LQ_Thr_Sel." Bit 8 selects the Link Quality Threshold to be read or written. A zero ("0") value selects the Low threshold and a one ("1") value selects the High threshold. When combined with the Link Quality Parameter Select field (i.e., Bit 11, Bit 10, Bit 9), the following encodings are available:

(1) "000,0" represents DEQ_C1 Low (2) "000,1" represents DEQ_C1 High (3) "001,0" represents DAGC Low (4) "001,1" represents DAGC High (5) "010,0" represents DBLW Low (6) "010,1" represents DBLW High (7) "011,0" represents Frequency Offset Low (8) "011,1" represents Frequency Offset High (9) "100,0" represents Frequency Control Low

(10) "100,1" represents Frequency Control High

Bit 7 through Bit 0 represent a data field for the Link Quality Threshold Data. The data field is designated "LQ_Thr_Data." The operation of the LQ_Thr_Data field is dependent on the value of the Sample DSP Parameter bit (Bit 13). Assume that Bit 13 is equal to a value of zero (i.e., Sample_Param=0). On a write, the LQThrData field contains the data that is to be written to the selected Link Quality Threshold register. On a read, the LQThrData field contains the current data in the selected Link Quality Threshold register.

Now assume that Bit 13 is equal to a value of one (i.e., SampleParam=1). On a read, the LQ_Thr_Data field contains the sampled parameter value. This sampled parameter value will remain unchanged until a new read sequence is started.

Prior to setting the threshold values, it is recommended that the link quality monitor software be used to check the current adapted values. The thresholds may then be set relative to the adapted values. The current adapted values can be read using the Link Quality Data Register ("LQDR") by setting the "Sample_Param" bit.

For example, in order to read the current value of the Digital Base-Line Wander Control ("DBLW"), the user writes a value of 2400h (h=hexadecimal) to the Link Quality Data Register ("LQDR") to set the "Sample_Param" bit and set the "LQ_Param_Sel" to a value of "010" for DBLW. Then the Link Quality Data Register ("LQDR") is read. The current value of DBLW is returned in the low eight (8) bits.

The Link Quality Data Register ("LQDR") also provides a method of programming high and low thresholds for each of the parameters that can be monitored. The Link Quality Data Register ("LQDR") implements an indirect read/write mechanism. Writes are accomplished by writing data, address, and a write strobe to the LQDR register. Reads are accomplished by writing the address to the LQDR register, and then reading back the value of the selected threshold.

Setting thresholds to the maximum or minimum values will disable the threshold comparison because the values have to exceed the threshold in order to generate a warning condition. Warnings are not generated if the parameter is equal to the threshold value. By default, all thresholds are disabled by setting the minimum or maximum values.

FIG. 8 illustrates the parameter ranges for the parameters of the link quality monitor 310 of the present invention. As shown in FIG. 8, the minimum value for the Digital Equalizer C1 Coefficient ("DEQ C1") parameter is a negative one hundred twenty eight (−128) and the maximum value is a positive one hundred twenty seven (+127). The minimum value for the Digital Adaptive Gain Control ("DAGC") parameter is zero (0) and the maximum value is a positive two hundred fifty five (+255).

The minimum value for the Digital Base-Line Wander Control ("DBLW") parameter is a negative one hundred twenty eight (−128) and the maximum value is a positive one hundred twenty seven (+127). The minimum value for the Recovered Clock Long-Term Frequency Offset ("Freq Offset") parameter is a negative one hundred twenty eight (−128) and the maximum value is a positive one hundred twenty seven (+127).

Lastly, the minimum value for the Recovered Clock Frequency Control ("Freq Control") parameter is a negative one hundred twenty eight (−128) and the maximum value is a positive one hundred twenty seven (+127).

FIGS. 9A and 9B illustrate a table showing the input/output signal interface definitions for the link quality monitor 310. As shown in FIGS. 9A and 9B, there are sixteen (16) input/output signals. The first signal in the table is an output signal designated "lqm_drop_link." The "lqm_drop_link" signal is output to the digital signal processor 210. The "lqm_drop_link" signal commands the digital signal processor 210 to drop the link and restart the adaptation process based on a Link Quality Monitor warning.

Figure 10:
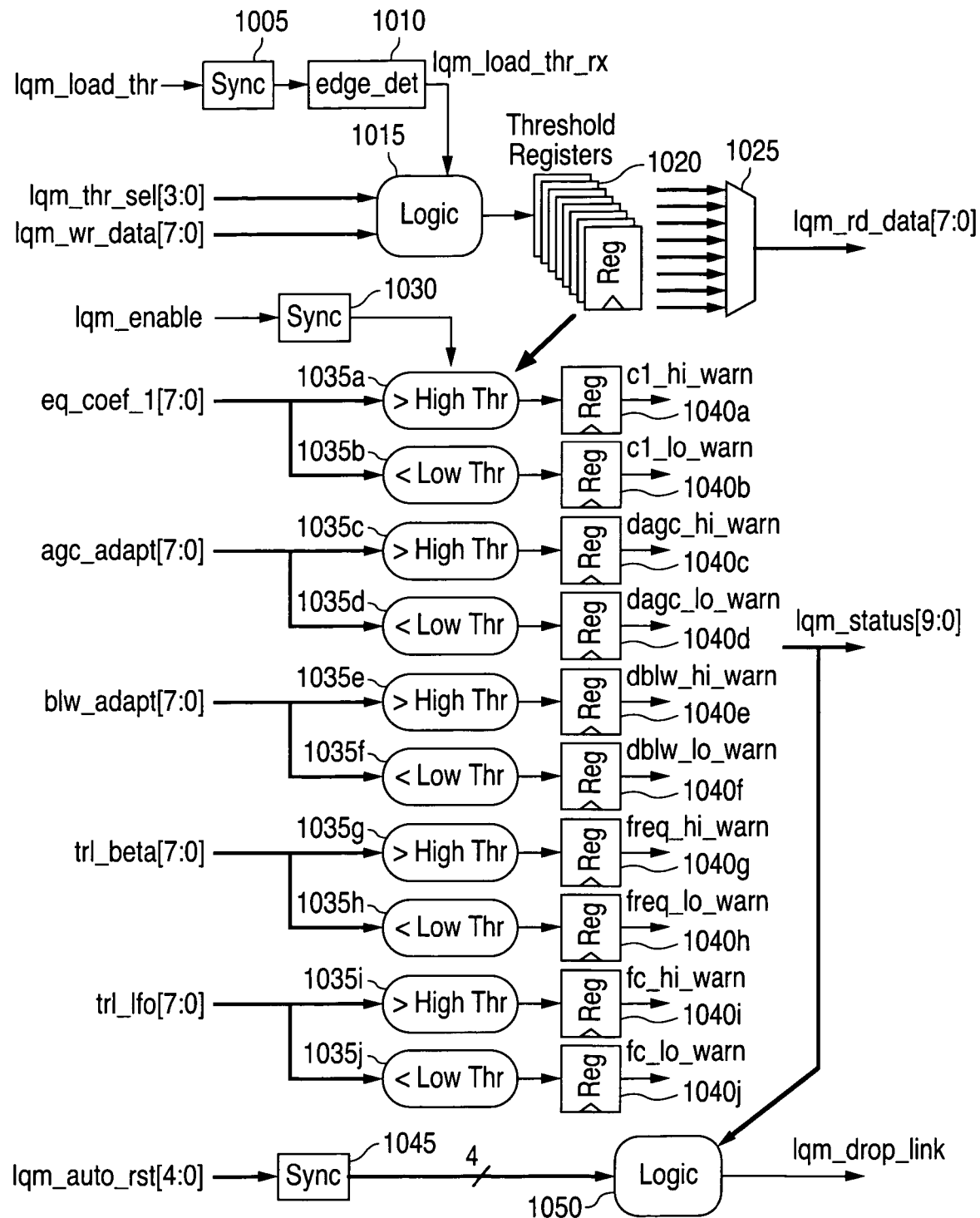
FIG. 10 illustrates a block diagram showing some components of the link quality monitor of the present invention.

The second signal in the table is an output signal designated "lqm_rd_data[7:0]." The "lqm_rd_data[7:0]" signal outputs data from a selected register of a plurality of threshold registers (shown in FIG. 10). The particular register is selected using the input signal "lqm_thr_sel[3:0]" (described below).

The third signal in the table is an output signal designated "lqm_status[9:0]." The "lqm_status[9:0]" signal outputs a Link Quality Monitor warning status. The "lqm_status[9:0]" signal contains the concatenated status bits from the threshold comparators (shown in FIG. 10). The "lqm_status[9:0]" signal values are made available to software through the register interface. In addition, assertion of any of the "lqm_status[9:0]" signals may be used to generate an interrupt to the Media Access Controller 120.

The fourth signal in the table is an input signal designated "agc_adapt[7:0]." The "agc_adapt[7:0]" signal is received from the digital signal processor 210. The "agc_adapt[7:0]" signal contains the upper eight (8) bits of the Automatic Gain Control ("AGC") parameter value.

The fifth signal in the table is an input signal designated "blw_adapt[7:0]." The "blw_adapt[7:0]" signal is received from the digital signal processor 210. The "blw_adapt[7:0]" signal contains the upper eight (8) bits of the Base Line Wander ("BLW") parameter value.

The sixth signal in the table is an input signal designated "clk." The "clk" signal is the clock signal that is received from 125 MHz receive clock 170 (REF_CLK2 170).

The seventh signal in the table is an input signal designated "eq_coef_1[7:0]." The "eq_coef_1[7:0]" signal is received from the digital signal processor 210. The "eq_coef_1 [7:0]" signal contains the upper eight (8) bits of the DEQ C1 coefficient.

The eighth signal in the table is an input signal designated "lqm_auto_rst[4:0]." The "lqm_auto_rst[4:0]" signal is received from the Register Block 230 (not shown in FIG. 10). The "lgm_auto_rst[4:0]" signal enables an automatic reset of the digital signal processor 210 upon the occurrence of a Link Quality Monitor warning.

The ninth signal in the table is an input signal designated "lqm_enable." The "lqm_enable" signal is received from the Register Block 230 (not shown in FIG. 10). The "lqm_enable" signal enables the operation of link quality monitor 130.

The tenth signal in the table is an input signal designated "lqm_load_thr." The "lqm_load_thr" signal is received from the Register Block 230 (not shown in FIG. 10) The "lqm_load_thr" signal loads the value on the input signal "lqm_wr_data" (described below) to the selected threshold register (shown in FIG. 10). The register is selected using the input signal "lqm_thr_sel[3:0]" (described below).

The eleventh signal in the table is an input signal designated "lqm_thr_sel[3:0]." The "lqm_thr_sel[3:0]" signal is received from the Register Block 230 (not shown in FIG. 10). The "lqm_thr_sel[3:0]" signal selects a threshold register (shown in FIG. 10) for read/write access.

The twelfth signal in the table is an input signal designated "lqm_wr_data[7:0]." The "lqm_wr_data[7:0]" signal is received from the Register Block 230 (not shown in FIG. 10). The "lqm_wr_data[7:0]" writes data to a selected threshold register (shown in FIG. 10).

The thirteenth signal in the table is an input signal designated "pmd_init_locked." The "pmd_init_locked" signal is received from the digital signal processor 210. The "pmd_init_locked" signal indicates that a digital signal processor initialization is complete. The "pmd_init_locked" signal is used to allow comparisons against the threshold values. If the "pmd_init_locked" signal is not asserted, then the link quality monitor 310 will not report any threshold violations.

The fourteenth signal in the table is an input signal designated "rst_n." The "rst_n" signal is received from a reset control block (not shown). The "rst_n" signal resets the link quality monitor 310.

The fifteenth signal in the table is an input signal designated "trl_beta[7:0]." The "tri_beta[7:0]" signal is received from the digital signal processor 210. The "trl_beta[7:0]" signal contains a Beta Accumulator value for the Timing Recovery Loop. The "trl_beta[7:0]" signal indicates the frequency offset of a local station to partner.

The sixteenth signal in the table is an input signal designated "trl_lfo[7:0]." The "trl_lfo[7:0]" signal is received from the digital signal processor 210. The "trl_lfo[7:0]" signal contains Frequency Control Output of the Timing Recovery Loop. The "trl_lfo[7:0]" signal indicates the short term phase correction in addition to frequency offset.

FIG. 10 illustrates a block diagram showing components of the link quality monitor 310. As shown in FIG. 10, the "lqm_load_thr" signal is provided to a first synchronization unit 1005 (designated "sync"). The output of the first synchronization unit 1005 is provided to an edge detection unit 1010 (designated "edge_det"). The edge detection unit 1010 outputs the "lqm_load_thr_rx" signal to a logic unit 1015.

The logic unit 1015 also receives the threshold select signal "lqm_thr_sel[3:0]" and also receives the "write data" signal "lqm_wr_data[7:0]". The logic unit 1015 writes the data in the "write data" signal to the threshold register that is selected by the threshold select signal "lqm_thr_sel[3:0]". The threshold registers are shown collectively in FIG. 10 as a plurality of threshold registers 1020. When data is read from one of the threshold registers 1020 the data that is read is output from multiplexer 1025 as the "lqm_rd_data[7:0]" signal.

The "lqm_enable" signal is provided to a second synchronization unit 1030 (designated "sync"). The output of the second synchronization unit 1005 enables the threshold logic units (1035a through 1035j). The first threshold logic unit 1035a tests the "eq_coef_1[7:0]" signal to determine whether the DEQ C1 coefficient exceeds its high threshold value. If the high threshold value is exceeded for the DEQ C1 coefficient, then a first warning signal (designated "c1_hi_warn") is sent to the first warning signal register 1040a. The second threshold logic unit 1035b tests the "eq_coef_1[7:0]" signal to determine whether the DEQ C1 coefficient exceeds its low threshold value. If the low threshold value is exceeded for the DEQ C1 coefficient, then a second warning signal (designated "c1_lo_warn") is sent to the second warning signal register 1040b.

The third threshold logic unit 1035c tests the "agc_adapt [7:0]" signal to determine whether the automatic gain control (AGC) parameter exceeds its high threshold value. If the high threshold value is exceeded for the AGC parameter, then a third warning signal (designated "dagc_hi_warn") is sent to the third warning signal register 1040c. The fourth threshold logic unit 1035d tests the "agc_adapt[7:0]" signal to determine whether the AGC parameter exceeds its low threshold value. If the low threshold value is exceeded for the AGC parameter, then a fourth warning signal (designated "dagc_lo_warn") is sent to the fourth warning signal register 1040d.

The fifth threshold logic unit 1035e tests the "blw_adapt [7:0]" signal to determine whether the base line wander (BLW) parameter exceeds its high threshold value. If the high threshold value is exceeded for the BLW parameter, then a fifth warning signal (designated "dblw_hi_warn") is sent to the fifth warning signal register 1040d. The sixth threshold logic unit 1035e tests the "blw_adapt[7:0]" signal to determine whether the BLW parameter exceeds its low threshold value. If the low threshold value is exceeded for the BLW parameter, then a sixth warning signal (designated "dblw_lo_warn") is sent to the sixth warning signal register 1040f.

The seventh threshold logic unit 1035g tests the "trl_beta [7:0]" signal to determine whether the frequency offset parameter exceeds its high threshold value. If the high threshold value is exceeded for the frequency offset parameter, then a seventh warning signal (designated "freq_hi_warn") is sent to the seventh warning signal register 1040g. The eighth threshold logic unit 1035h tests the "trl_beta[7:0]" signal to determine whether the frequency offset parameter exceeds its low threshold value. If the low threshold value is exceeded for the frequency offset parameter, then an eighth warning signal (designated "freq_lo_warn") is sent to the eighth warning signal register 1040h.

The ninth threshold logic unit 1035i tests the "trl_lfo[7:0]" signal to determine whether the frequency control parameter exceeds its high threshold value. If the high threshold value is exceeded for the frequency control parameter, then a ninth warning signal (designated "fc_hi_warn") is sent to the ninth warning signal register 1040i. The tenth threshold logic unit 1035j tests the "trl_lfo[7:0]" signal to determine whether the frequency control parameter exceeds its low threshold value. If the low threshold value is exceeded for the frequency control parameter, then a tenth warning signal (designated "fc_lo_warn") is sent to the tenth warning signal register 1040b.

The output of the ten warning signal registers (1040a through 1040j) is provided in the output signal "lqm_status [9:0]." The output signal "lqm_status[9:0]" contains the status of each of the ten warning signal registers.

The "lqm_auto_rst[4:0]" signal enables the automatic reset of the digital signal processor 210 when a Link Quality Monitor warning occurs. The "lqm_auto_rst[4:0]" signal is provided to a third synchronization unit 1045. The third synchronization unit 1045 provides the "lqm_auto_rst[4:0]" signal to logic unit 1050. Logic unit 1050 also receives as input the warning signal register status signal "lqm_status[9:0]." Upon assertion of one of the "lqm_status[9:0]" signals, if the associated "lqm_auto_rst[4:0] bit is asserted, the logic unit 1050 sends the "drop link" signal ("lqm_drop_link") to the digital processing unit 210. The "drop link" signal causes the digital processing unit 210 to drop the current data link and reset by establishing a new data link.

The link quality monitor 310 of the present invention performs the following logic functions.

Synchronization. The link quality monitor 310 locally synchronizes input control signals from the Register Block 230. This feature allows for easier instantiation of the link quality monitor 310 as a stand-alone monitor. The synchronization function may be easily removed if the synchronization function is not desired. Only control signals are synchronized. The "lqm_wr_data" signal and the "lqm_thr_sel" signal are assumed to be constant prior to a write strobe or a read access.

Threshold Register Read/Write. Each threshold value may be individually written and read back through the register interface. Threshold registers are written by pulsing the "lqm_load_thr" signal. The data value on "lqm_wr_data" is written to the register that is selected by the "lqm_thr_sel" signal. The "lqm_load_thr" signal is edge detected to create a single clock pulse write strobe.

Threshold Comparison Logic. Threshold comparisons are enabled if the "lqm_enable" signal is asserted and the digital signal processor ("DSP") 210 is in a locked state as determined by the DSP Initialization Sequence ("pmd_init_locked"). High thresholds are met if the parameter value is greater than the threshold. Low thresholds are met if the parameter value is less than the threshold. Note that values that are equal to the threshold values will not trigger a warning. By default, the thresholds are set to the maximum value for High thresholds and to the minimum value for Low thresholds. This disables each of the individual thresholds. All values except the DAGC values are signed values. To simplify the calculation, both parameter and threshold values are converted to offset binary prior to the comparison logic.

Automatic DSP Reset Logic. The link quality monitor 310 may be configured (through the "lqm_auto_rst" controls) to reset the digital signal processor 210 upon an occurrence of a warning from the link quality monitor 310. The "lqm_drop_link" signal is sent from the link quality monitor 310 to a DSP Initialization State Machine (not shown) in the digital signal processor 210 to cause it to go into an IDLE state. This will cause the link monitor (not shown) in the digital signal processor 210 to deassert the Link status.

The foregoing description has outlined in detail the features and technical advantages of the present invention so that persons who are skilled in the art may understand the advantages of the invention. Persons who are skilled in the art should appreciate that they may readily use the conception and the specific embodiment of the invention that is disclosed as a basis for modifying or designing other structures for carrying out the same purposes of the present invention. Persons who are skilled in the art should also realize that such equivalent constructions do not depart from the spirit and scope of the invention in its broadest form.

Although the present invention has been described with an exemplary embodiment, various changes and modifications may be suggested to one skilled in the art. It is intended that the present invention encompass such changes and modifications as fall within the scope of the appended claims.

What is claimed is:

1. An apparatus for monitoring data link quality in a network physical layer device that comprises a digital signal processor, said apparatus comprising:
   a link quality monitor configured to (i) detect an operational value of each of a plurality of
   data link parameters of said digital signal processor and (ii) determine when the operational value of at least one of said data link parameters deviates from a preselected range of values for that data link parameter;
   wherein said plurality of data link parameters comprises a digital equalizer coefficient, a digital adaptive gain control, a digital base line wander, a recovered clock long-term frequency offset, and a recovered clock frequency control; and
   wherein each of said data link parameters is controlled by multiple control bits in a register, said control bits for each data link parameter comprising a break link bit, a high threshold bit, and a low threshold bit.

2. The apparatus as set forth in claim 1 wherein said link quality monitor, upon determining that said operational value of at least one of said data link parameters deviates from said preselected range of values for that data link parameter, is configured to at least one of: generate a warning status to interrupt a controller of said network physical layer device, and provide status to the register to allow monitoring of link quality by register polling.

3. The apparatus as set forth in claim 1 wherein the break link bit for each data link parameter allows the link quality monitor to automatically break a data link upon determining that the operational value of that data link parameter deviates from the preselected range of values for that data link parameter.

4. The apparatus as set forth in claim 1 wherein said preselected range of values for one of said data link parameters is defined by a high operational threshold value and a low operational threshold value associated with that data link parameter.

5. The apparatus as set forth in claim 4 wherein said high operational threshold value and said low operational threshold value are configured to be set in response to a user instruction to said link quality monitor.

6. The apparatus as set forth in claim 4 wherein the high threshold bit for the one data link parameter indicates whether the high operational threshold value for that data link parameter has been violated; and
   wherein the low threshold bit for the one data link parameter indicates whether the low operational threshold value for that data link parameter has been violated.

7. The apparatus as set forth in claim 4 wherein said link quality monitor is configured to read an initial value of said one data link parameter and then establish said high operational threshold value and said low operational threshold value for said data link parameter based on an expected valid range for said data link parameter.

8. The apparatus as set forth in claim 7 wherein said link quality monitor is configured to reset said digital signal processor and readapt said one data link parameter when the operational value of said one data link parameter (1) increases above said high operational threshold value, or (2) decreases below said low operational threshold value.

9. An apparatus for monitoring data link quality in a network physical layer device that comprises a digital signal processor, wherein said apparatus comprises:
  a link quality monitor configured to (i) detect operational values of a plurality of data link parameters of said digital signal processor and (ii) determine when said operational value of at least one of said plurality of data link parameters moves outside an operating range defined by a high operational threshold value and a low operational threshold value for said at least one data link parameter;
  a Link Quality Monitor Register that comprises control bits that indicate whether (1) said operational value of said at least one data link parameter has exceeded said high operational threshold value for said at least one data link parameter, and (2) said operational value of said at least one data link parameter has moved below said low operational threshold value for said at least one data link parameter; and
  a Link Quality Data Register that comprises control bits that enable reading and setting of said high and low operational threshold values for each of said plurality of data link parameters;
  where said control bits in said Link Quality Data Register comprise:
    multiple bits that together represent one of said plurality of data link parameters; and
    at least one bit that represents one of said high operational threshold value and said low operational threshold value for said data link parameter represented by the multiple bits.

10. The apparatus as set forth in claim 9 wherein said plurality of data link parameters comprises at least one of: a digital equalizer coefficient, a digital adaptive gain control, a digital base line wander, a recovered clock long-term frequency offset, and a recovered clock frequency control.

11. The apparatus as set forth in claim 9 wherein said link Quality Monitor Register further comprises control bits that at least one of: (1) trigger sending of a drop link signal to said digital signal processor, and (2) trigger generation of a warning status to interrupt a controller of said network physical layer device, when at least one of said data link parameters moves outside said operating range for said data link parameter.

12. The apparatus as set forth in claim 9 wherein said link quality monitor comprises a plurality of threshold registers, wherein each threshold register contains at least one of: (1) said high operational threshold value for said at least one data link parameter, and (2) said low operational threshold value for said at least one data link parameter.

13. The apparatus as set forth in claim 12 wherein said link quality monitor further comprises a plurality of threshold logic units configured to receive said operational values of said plurality of data link parameters, wherein each threshold logic unit is configured to determine whether said operational value of its respective data link parameter violates one of said operational threshold values for said respective data link parameter.

14. The apparatus as set forth in claim 13 wherein said link quality monitor further comprises a plurality of warning signal registers, wherein each of said warning signal registers is associated with one of said threshold logic units.

15. The apparatus as set forth in claim 9 wherein said control bits in said Link Quality Data Register comprise:
  three bits that together represent one of said plurality of data link parameters to be read from or written to; and
  one bit that represents one of said high operational threshold value and said low operational threshold value for said selected data link parameter.

16. A system comprising:
  a network physical layer device comprising a digital signal processor; and
  an apparatus for monitoring data link quality in said network physical layer device, wherein
  said apparatus comprises:
    a link quality monitor configured to (i) detect an operational value of each of a plurality of data link parameters of said digital signal processor and (ii) determine when the operational value of at least one of said data link parameters moves outside a range defined by a high operational threshold value and a low operational threshold value for that data link parameter; and
    a register block configured to receive operational status signals and data signals from said link quality monitor and to send control signals to said link quality monitor, wherein said register block comprises control bits that enable reading and setting of said high and low operational threshold values for each of said plurality of data link parameters; and
  where said control bits in said register block comprise:
    multiple bits that together represent one of said plurality of data link parameters; and
    at least one bit that represents one of said high operational threshold value and said low operational threshold value for said data link parameter represented by the multiple bits.

17. The system as set forth in claim 16 wherein said link quality monitor, upon determining that said operational value of said at least one data link parameter Inoves outside said range for that data link parameter, is configured to at least one of: generate a warning status to interrupt a controller of said network physical layer device, and provide status to the register block to allow monitoring of link quality by register polling.

18. The system as set forth in claim 16 wherein said data link parameters comprise at least one of: a digital equalizer coefficient, a digital adaptive gain control, a digital base line wander, a recovered clock long-term frequency offset, and a recovered clock frequency control.

19. The system as set forth in claim 16 wherein said link quality monitor is configured to read an initial value of said at least one data link parameter and then establish said high operational threshold value and said low operational threshold value for said at least one data link parameter based on an expected valid range for said at least one data link parameter.

20. The system as set forth in claim 16 wherein said link quality monitor is configured to reset said digital signal processor and readapt said at least one data link parameter when the operational value of said at least one data link parameter (1) increases above said high operational threshold value, or (2) decreases below said low operational threshold value.

* * * * *